United States Patent
Shimada et al.

(10) Patent No.: US 12,461,796 B2
(45) Date of Patent: Nov. 4, 2025

(54) COMPUTER AND MODEL GENERATION METHOD

(71) Applicant: Hitachi, Ltd., Tokyo (JP)

(72) Inventors: Akio Shimada, Tokyo (JP); Mitsuo Hayasaka, Tokyo (JP)

(73) Assignee: HITACHI VANTARA, LTD., Kanagawa-Ken (JP)

( * ) Notice: Subject to any disclaimer, the term of this patent is extended or adjusted under 35 U.S.C. 154(b) by 470 days.

(21) Appl. No.: 18/182,724

(22) Filed: Mar. 13, 2023

(65) Prior Publication Data

US 2024/0103935 A1 Mar. 28, 2024

(30) Foreign Application Priority Data

Sep. 26, 2022 (JP) .................................. 2022-152955

(51) Int. Cl.
*G06F 9/50* (2006.01)
*G06F 11/34* (2006.01)

(52) U.S. Cl.
CPC ........ *G06F 9/5094* (2013.01); *G06F 11/3409* (2013.01); *G06F 2209/501* (2013.01)

(58) Field of Classification Search
None
See application file for complete search history.

(56) References Cited

U.S. PATENT DOCUMENTS

| 8,595,515 B1* | 11/2013 | Weber ....................... G06F 1/26 713/320 |
| 9,355,000 B1* | 5/2016 | Biswas ............... G06F 11/3062 |
| 2013/0211752 A1* | 8/2013 | Shi ....................... G06F 11/3024 702/61 |
| 2022/0075657 A1* | 3/2022 | Shimada ............. G06F 11/3409 |

* cited by examiner

*Primary Examiner* — Craig C Dorais
(74) *Attorney, Agent, or Firm* — Volpe Koenig

(57) ABSTRACT

The CPU of the management node measures the power consumption of a computer node while causing the computer node to execute the power measurement benchmark that uses hardware whose resource is allocated to a program to be executed by the computer node, where the CPU is changing the use amount of the resource while causing the computer node to execute the power measurement benchmark. The CPU generates a power consumption model representing a relationship between an allocation amount of the resource to be allocated to the program and the power consumption on the basis of a measurement result obtained by measuring the power consumption.

7 Claims, 13 Drawing Sheets

COMPUTER AND MODEL GENERATION METHOD

BACKGROUND OF THE INVENTION

1. Field of the Invention

The present disclosure relates to a computer and a model generation method.

2. Description of the Related Art

A technology is attracting attentions that analyzes data stored in a storage by using an application program such as artificial intelligence (AI) or data analysis software and uses an analysis result for various services. In this type of technology, a computer system having a plurality of bases such as a hybrid cloud environment across an on-premises data center and a public cloud are sometimes used as a platform for performing data analysis. In data analysis using a computer system having a plurality of bases, data and an application program are disposed in appropriate bases in consideration of indices such as cost and target performance (such as execution time) required for the data analysis, and the data analysis is performed in those bases.

JP 2022-045666 A discloses a technique for controlling a hardware (HW) resource amount that is a resource amount of hardware allocated to software executed on a calculation node, in accordance with target performance specified by a user. By using this technology, it is possible to dispose the data and the application program in such bases that the target performance is satisfied.

SUMMARY OF THE INVENTION

In recent years, improvement or conservation of the global environment has been regarded as important, and accordingly utilization of renewable energy has been required. In data analysis using a computer system having a plurality of bases, for example, it is considered that renewable energy can be efficiently utilized by, for example, disposing data and application programs in such a manner that utilization efficiency of renewable energy can be increased. However, in the technology described in JP 2022-045666 A, it is impossible to predict a power consumption to be consumed at a computer node on each base at the time of performing data analysis, and it is therefore impossible to efficiently utilize renewable energy.

An object of the present disclosure is to provide a computer and a model generation method capable of predicting power consumption of a computer node.

A computer according to an aspect of the present disclosure includes a processor, and the processor is configured to measure power consumption of a predetermined computer node while causing the predetermined computer node to execute a power measurement program that uses a resource of hardware whose resource is allocated to a program to be executed on the predetermined computer node, the processor changing a use amount of the resource while causing the predetermined computer node to execute the power measurement program, and generate a power consumption model representing a relationship between an allocation amount of the resource to be allocated to the program and the power consumption on the basis of a measurement result obtained by measuring the power consumption.

The present invention makes it possible to predict power consumption of a computer node.

DESCRIPTION OF THE PREFERRED EMBODIMENT

Hereinafter, an embodiment of the present disclosure will be described with reference to the drawings. Note that the embodiment described below does not limit the disclosure according to the claims, and all the elements described in the embodiment and combinations thereof are not necessarily essential to the solution of the present disclosure.

Note that, in the following description, processes may be described using a term "program" as a subject. However, the program is executed by a processor such as a central processing unit (CPU) to perform a predetermined process appropriately using a storage resource (for example, a memory) and/or a communication interface device such as a network interface card (NIC). Therefore, the subject of the process may be considered to be a process performed by a processor or a computer including a processor.

Figure 1:
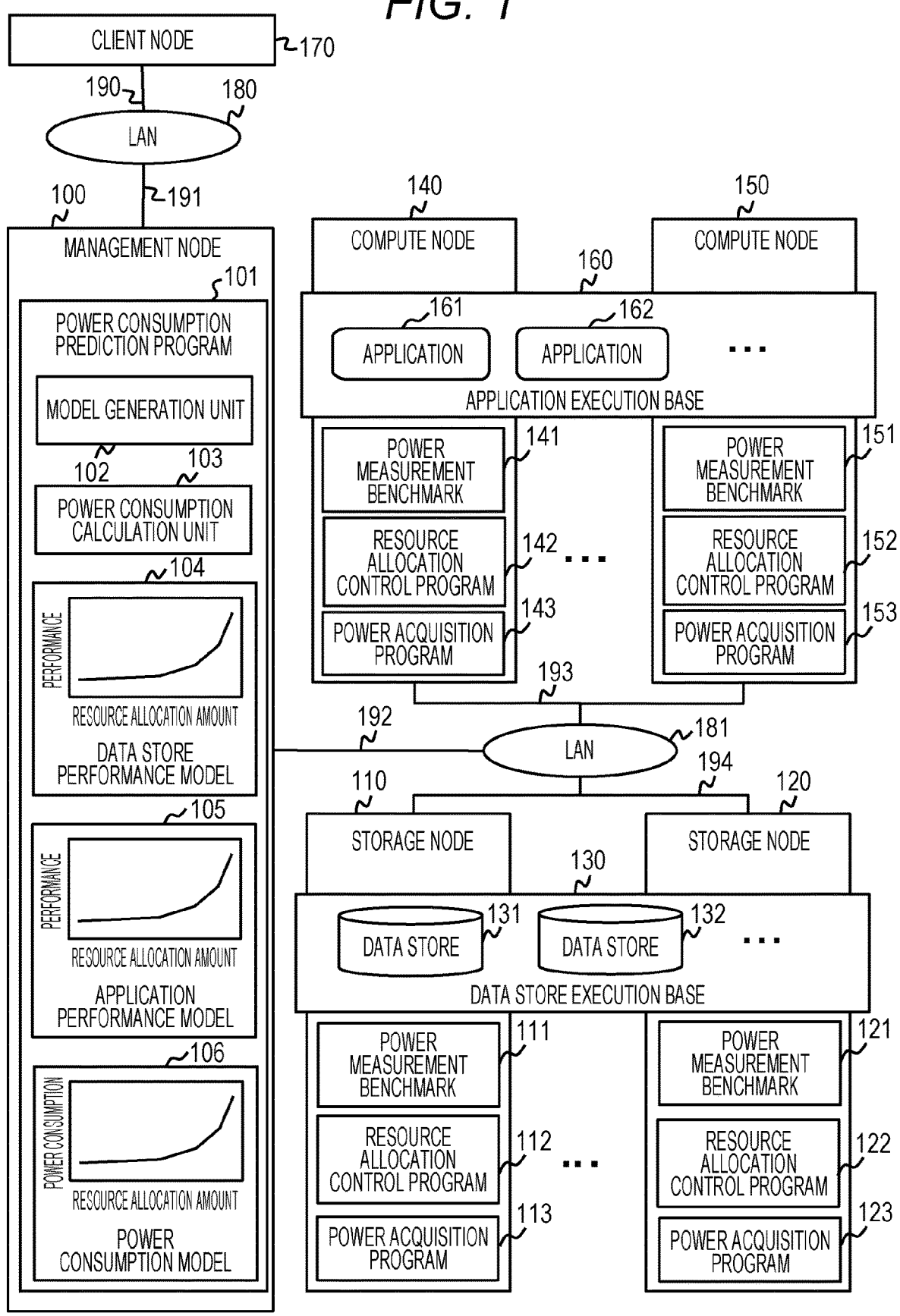
FIG. 1 is a diagram illustrating an entire configuration of a computer system according to an embodiment of the present disclosure.

FIG. 1 is a diagram illustrating an entire configuration of a computer system according to an embodiment of the present disclosure. The computer system illustrated in FIG. 1 includes, as computer nodes, a management node 100, storage nodes 110 and 120, compute nodes 140 and 150, and a client node 170. The management node 100 and the client node 170 are connected to each other via a local area network (LAN) 180 and networks 190 and 191. The management node 100, the storage nodes 110 and 120, and the compute nodes 140 and 150 are connected to each other via a LAN 181 and networks 192, 193, and 194.

The management node 100 is a computer that manages the storage nodes 110 and 120 and the compute nodes 140 and 150. In the present embodiment, the management node predicts power consumption that is the amount of power consumed by the storage nodes 110 and 120 and the compute nodes 140 and 150. Specifically, the management node 100 executes a power consumption prediction program 101 for predicting the power consumption to implement a model generation unit 102 and a power consumption calculation unit 103. The model generation unit 102 generates and manages a data store performance model 104, an application performance model 105, and a power consumption model 106 as models for predicting the power consumption. The power consumption calculation unit 103 predicts power consumption of the storage nodes 110 and 120 and the compute nodes 140 and 150 by using each model generated by the model generation unit 102.

The storage nodes 110 and 120 are computer nodes for reading and writing data from and to storage devices. The storage nodes 110 and 120 are logically connected by a data store execution base 130 for executing a data store program (hereinafter, abbreviated as data store), and execute the data store, on the data store execution base 130. The data store is a program for reading and writing data from and to the storage devices, and executes IO processing for reading and writing data in response to IO requests from the compute nodes 140 and 150. In the present embodiment, the two storage nodes 110 and 120 are illustrated, but the number of storage nodes is not particularly limited. Although FIG. 1 shows two data stores 131 and 132 are illustrated, the number of data stores is not particularly limited. In addition, the data stores 131 and 132 may be distributed data stores that manage data in a distributed manner in the storage nodes 110 and 120.

The storage node 110 includes a power measurement benchmark 111, a resource allocation control program 112, and a power acquisition program 113. The power measurement benchmark 111 is a power measurement program that executes a benchmark process that is a use process using an HW resource that is a resource of hardware provided in the benchmark's own node (storage node 110). The resource allocation control program 112 controls a resource allocation amount that is an allocation amount of the HW resource to be allocated to a program executed on the resource allocation control program's own node. The power acquisition program 113 acquires power consumption that is the amount of power consumed by the power acquisition program's own node. The storage node 120 includes a power measurement benchmark 121, a resource allocation control program 122, and a power acquisition program 123 respectively having functions equivalent to those of the power measurement benchmark 111, the resource allocation control program 112, and the power acquisition program 113.

The compute nodes 140 and 150 are computer nodes for performing predetermined processes using data read and written from and to the storage devices. The compute nodes 140 and 150 are logically connected by an application execution base 160 for executing an application program (hereinafter, abbreviated as application), and execute the application, on the application execution base 160. The applications are programs for performing predetermined processes using data read and written from and to the storage devices. Note that, although two compute nodes 140 and 150 are illustrated in the present embodiment, the number of compute nodes is not particularly limited. Although FIG. 1 shows two applications 161 and 162, the number of applications is not particularly limited.

The compute node 140 includes a power measurement benchmark 141, a resource allocation control program 142, and a power acquisition program 143. The power measurement benchmark 141 executes a benchmark process using an HW resource of the benchmark's own node (compute node 140). The resource allocation control program 142 controls a resource allocation amount to be allocated to the program executed on the resource allocation control program's own node. The power acquisition program 113 acquires the power consumption of its own node. The compute node 150 includes a power measurement benchmark 151, a resource allocation control program 152, and a power acquisition program 153 respectively having functions equivalent to those of the power measurement benchmark 141, the resource allocation control program 142, and the power acquisition program 143.

The client node 170 is used by a user who uses the computer system. The client node 170 receives, for example, from the user a target performance that is a target value with respect to performance of a data store and an application, and the client node 170 transmits the target performance to the management node 100.

Figure 2:
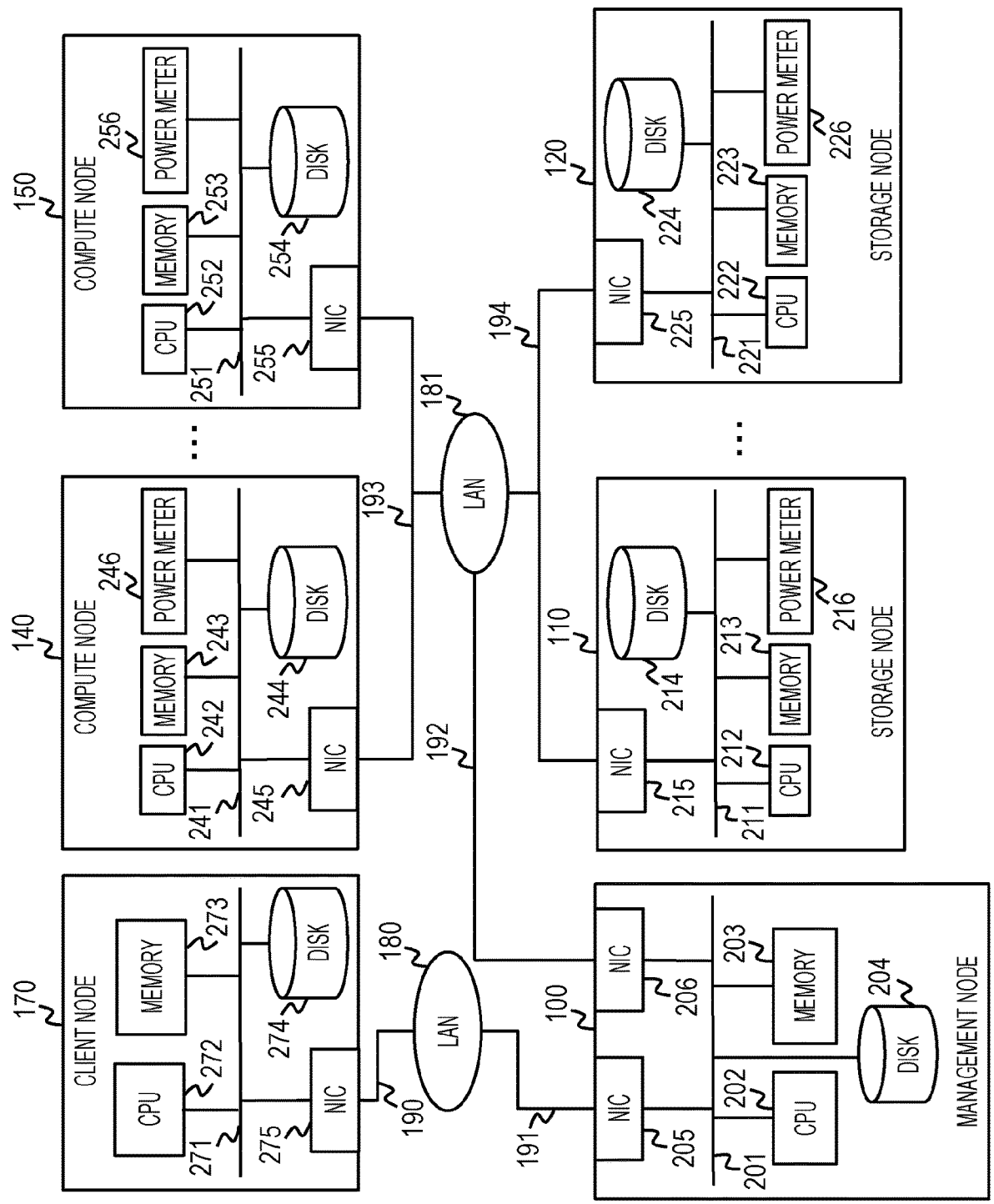
FIG. 2 is a diagram illustrating an HW configuration of a computer system according to an embodiment of the present disclosure.

FIG. 2 is a diagram illustrating an HW configuration of the computer system according to an embodiment of the present disclosure.

The management node 100 includes a CPU 202 as an example of a processor, a memory 203 as a main storage device, a disk device 204 as a secondary storage device, and NICs 205 and 206 as communication interfaces. The CPU 202, the memory 203, the disk device 204, and the NICs 205 and 206 are connected to each other via a bus 201.

The CPU 202 performs various processes by reading a program stored in the disk device 204 onto the memory 203 and executing the program. The CPU 202 transmits and receives data via the bus 201 and the NICs 205 and 206 to and from other devices (the storage nodes 110 and 120, the compute nodes 140 and 150, the client node 170, and the like) connected to the LANs 180 and 181.

The storage node 110 includes a CPU 212 as an example of a processor, a memory 213 as a main storage device, a disk device 214 as a secondary storage device, an NIC 215 as a communication interface, and a power meter 216. The CPU 212, the memory 213, the disk device 214, the NIC 215, and the power meter 216 are connected via a bus 211.

The CPU 212 performs various processes by reading a program stored in the disk device 214 onto the memory 213 and executing the program. The CPU 212 transmits and receives data via the bus 211 and the NIC 215 to and from other devices (the storage node 120, the compute nodes 140 and 150, the management node 100) connected to the LAN 181. The power meter 216 measures the power consumption of its own node. The disk device 214 may be used as a storage device that stores data. The storage device may be provided separately from the disk device 214.

The storage node 120 includes a CPU 222, a memory 223, a disk device 224, an NIC 225 as a communication interface, and a power meter 226 respectively having functions equivalent to those of the CPU 212, the memory 213, the disk device 214, and the NIC 215 as a communication interface, and the power meter 216 of the storage node 110, and these components are connected to each other via a bus 221.

The compute node 140 includes a CPU 242 as an example of a processor, a memory 243 as a main storage device, a disk device 244 as a secondary storage device, an NIC 245 as a communication interface, and a power meter 246. The CPU 242, the memory 243, the disk device 244, the NIC 245, and the power meter 246 are connected via a bus 241.

The CPU 242 performs various processes by reading a program stored in the disk device 244 onto the memory 243 and executing the program. The CPU 242 transmits and receives data via the bus 241 and the NIC 245 to and from other devices (the storage nodes 110 and 120, the compute node 150, and the management node 100) connected to the LAN 181. The power meter 246 measures the power consumption of its own node.

The compute node 150 includes a CPU 252, a memory 253, a disk device 254, an NIC 255, and a power meter 256 having functions equivalent to those of the CPU 242, the memory 243, the disk device 244 as a secondary storage device, the NIC 245, and the power meter 246 of the compute node 140, and these are connected to each other via a bus 251.

The client node 170 includes a CPU 272 as an example of a processor, a memory 273 as a main storage device, a disk device 274 as a secondary storage device, and an NIC 275 as a communication interface. The CPU 272, the memory 273, the disk device 274, and the NIC 275 are connected to each other via a bus 271.

The CPU 272 performs various processes by reading a program stored in the disk device 274 onto the memory 273 and executing the program. The CPU 272 transmits and receives data to and from another apparatus (the management node 100) connected to the LAN 180 via the bus 271 and the NIC 275.

Figure 3:
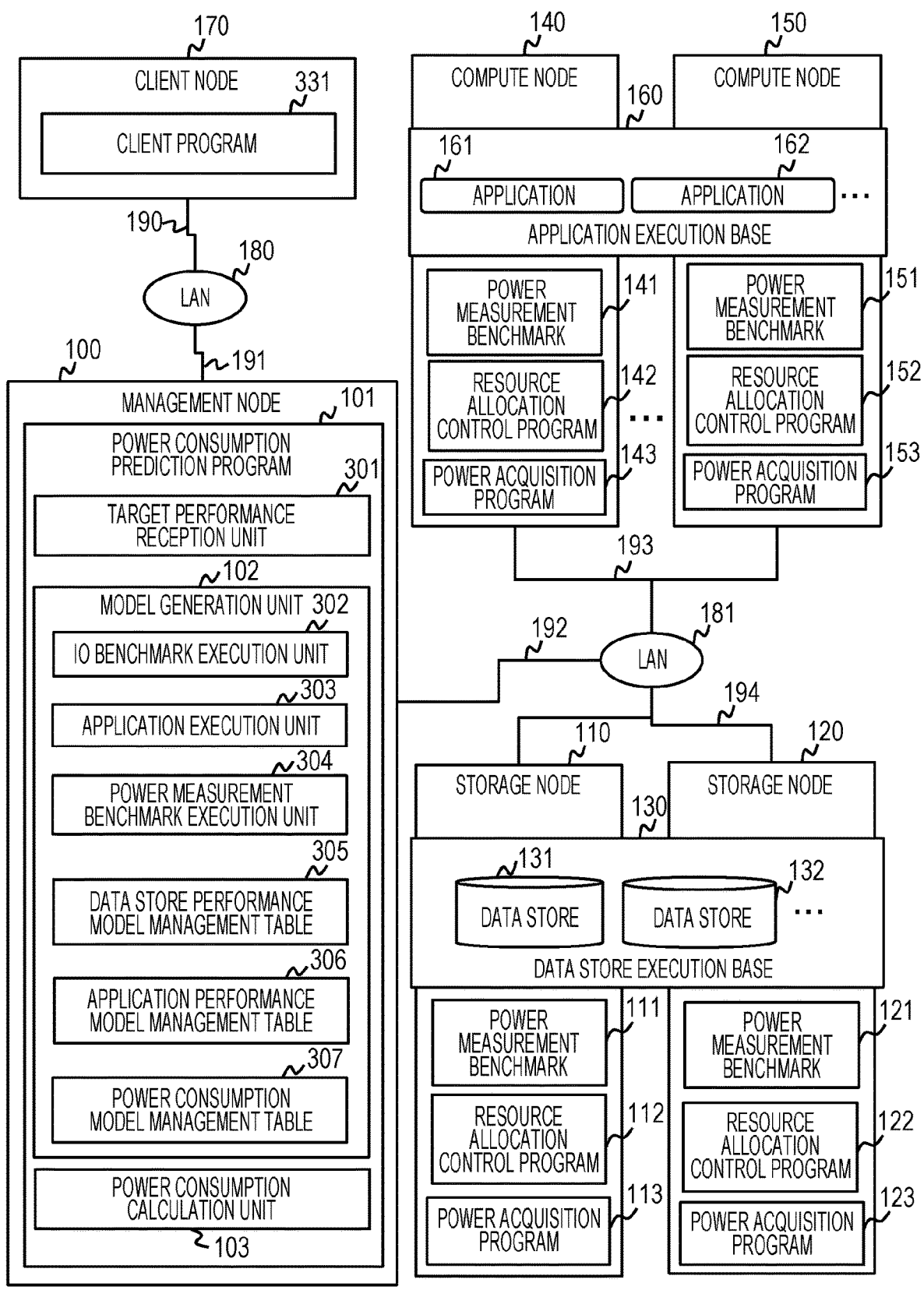
FIG. 3 is a diagram illustrating a software configuration of a computer system according to an embodiment of the present disclosure.

FIG. 3 is a diagram illustrating a software configuration of the computer system according to an embodiment of the present disclosure.

The management node 100 includes the power consumption prediction program 101. The power consumption prediction program 101 generates and manages various models and predicts the power consumption in each computer node by using those models. Specifically, the power consumption prediction program 101 is executed by the CPU 202 in FIG. 2 to implement a target performance reception unit 301, the model generation unit 102, and the power consumption calculation unit 103.

The target performance reception unit 301 receives target performances of the data store and the application from the client node 170.

The model generation unit 102 includes an IO benchmark execution unit 302 for generating the data store performance model 104, an application execution unit 303 for generating the application performance model 105, and a power measurement benchmark execution unit 304 for generating the power consumption model 106. The model generation unit 102 further includes a data store performance model management table 305 for managing the data store performance model 104, an application performance model management table 306 for managing the application performance model 105, and a power consumption model management table 307 for managing the power consumption model 106.

The data store performance model 104 and the application performance mode 1105 are performance models each representing a relationship between performance of a program to which an HW resource is to be allocated and a resource allocation amount that is the HW resource allocated to the program. In the present embodiment, the program that is an allocation target includes the data stores 131 and 132 and the applications 161 and 162. In addition, the data store performance model 104 represents a relationship between the performance of the data stores 131 and 132 and the resource allocation amount, and the application performance model 105 represents a relationship between the performance of the applications 161 and 162 and the resource allocation amount.

The power consumption model 106 represents a relationship between the resource allocation amount of the HW resource allocated to the allocation target program and the power consumption caused by execution of the program.

The power consumption calculation unit 103 calculates a predicted consumption amount that predicts the power consumption to be consumed by the computer nodes to achieve the target performance on the basis of the target performance received by the target performance reception unit 301 and the data store performance model 104, the application performance model 105, and the power consumption model 106 that are generated by the model generation unit 102.

The storage nodes 110 and 120 execute the data stores 131 and 132, on the data store execution base 130. The data stores 131 and 132 are disposed in a distributed manner in the storage nodes 110 and 120 and are executed in parallel. The data stores operating on respective ones of the storage nodes 110 and 120 operate in coordination to form one data store. Note that the data store execution base 130 is constructed by data store execution base programs (not shown) being executed in coordination on respective ones of the storage nodes 110 and 120.

In addition, as illustrated in FIG. 1, the storage node 110 includes the power measurement benchmark 111, the resource allocation control program 112, and the power acquisition program 113. The power measurement benchmark 111 executes a benchmark process that uses the HW resource of the storage node 110 in accordance with an instruction from the power measurement benchmark execution unit 304 of the management node 100. The resource allocation control program 112 controls the resource allocation amount of the HW resources to be allocated to the data stores 131 and 132 in accordance with an instruction from the IO benchmark execution unit 302 of the management node 100. The resource allocation control program 112 further controls the resource allocation amount of the HW resource to be allocated to the power measurement benchmark 111 in accordance with an instruction from the power measurement benchmark execution unit 304 of the management node 100. The power acquisition program 113 acquires the power consumption measured by the power meter 216 of its own node.

The power measurement benchmark 121, the resource allocation control program 122, and the power acquisition program 123 of the storage node 120 have functions equivalent to those of the power measurement benchmark 111, the resource allocation control program 112, and the power acquisition program 113 of the storage node 110.

The compute nodes 140 and 150 execute the applications 161 and 162, on the application execution base 160. The applications 161 and 162 are disposed on the compute nodes 140 and 150 in a distributed manner and are executed in parallel. The applications operating on respective ones of the compute nodes 140 and 150 operate in coordination to form one application. Note that the application execution base 160 is constructed by cooperative operation of application execution base programs (not shown) that are executed on the compute nodes 140 and 150.

In addition, as illustrated in FIG. 1, the compute node 140 includes the power measurement benchmark 141, the resource allocation control program 142, and the power acquisition program 143. The power measurement benchmark 141 executes a benchmark process that uses the HW resource of the compute node 140 in accordance with an instruction from the power measurement benchmark execution unit 304 of the management node 100. The resource allocation control program 142 controls the resource allocation amount of the HW resource to be allocated to an application in accordance with an instruction from the IO benchmark execution unit 302 of the management node 100. The resource allocation control program 142 further controls the resource allocation amount of the HW resource to be allocated to the power measurement benchmark 141 in accordance with an instruction from the power measurement benchmark execution unit 304 of the management node 100. The power acquisition program 143 acquires the power consumption measured by the power meter 246 of its own node.

The power measurement benchmark 151, the resource allocation control program 152, and the power acquisition program 153 of the compute node 150 have functions equivalent to those of the power measurement benchmark 141, the resource allocation control program 142, and the power acquisition program 143 of the compute node 140.

The client node 170 includes a client program 331. The client program 331 transmits a target performance of the data store and the application that are input from a user to the target performance reception unit 301 of the power consumption prediction program 101 of the management node 100.

Figure 4:
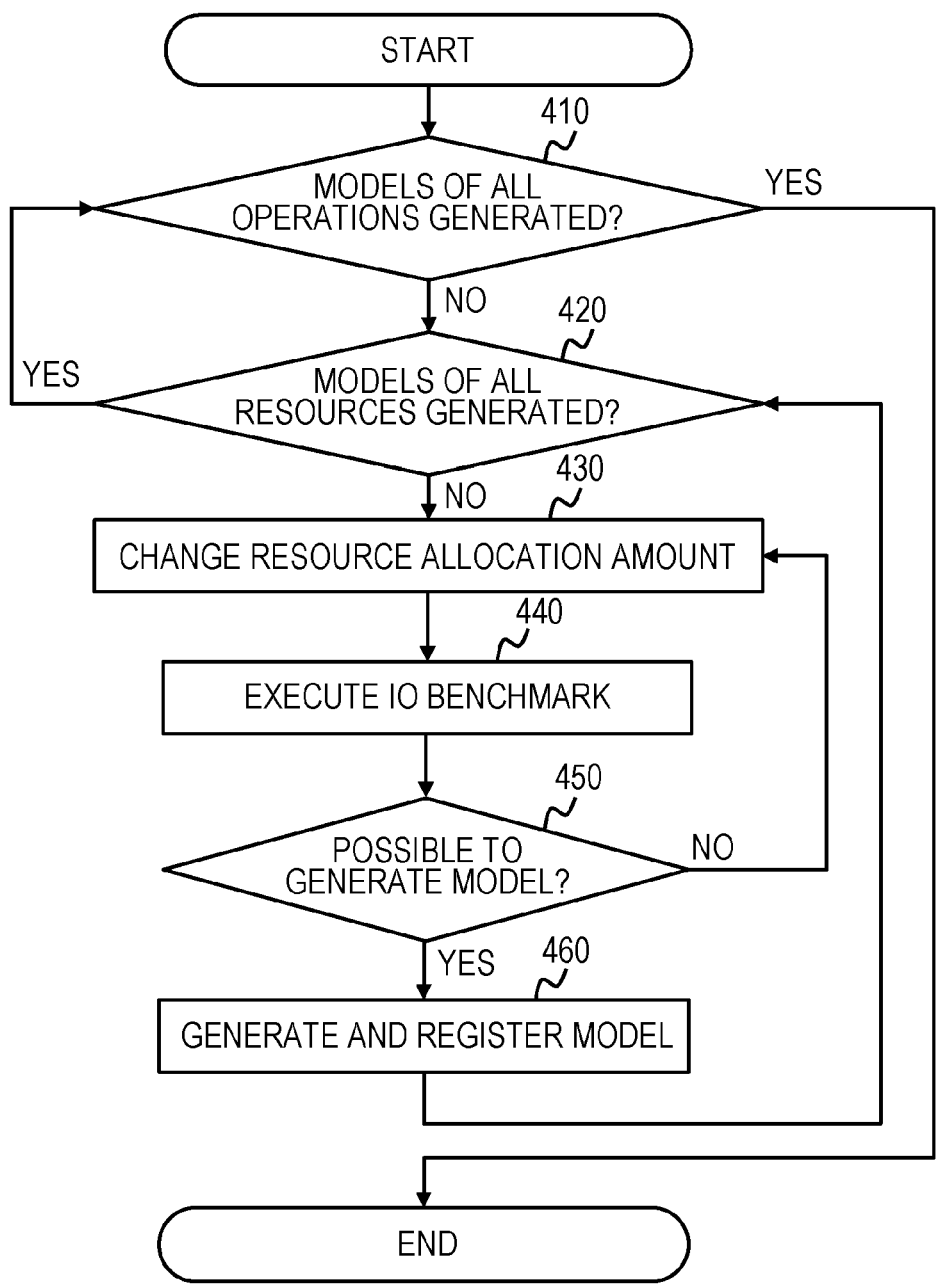
FIG. 4 is a flowchart for describing an example of a data store performance model generation process.

FIG. 4 is a flowchart for describing an example of a data store performance model generation process for generating the data store performance model 104 according to an embodiment of the present disclosure.

The data store performance model 104 is generated for the storage nodes 110 and 120. In the present embodiment, the storage nodes 110 and 120 each have HW specifications equivalent to each other. In this case, the data store performance model 104 is only required to be generated for one of the storage nodes 110 and 120. Hereinafter, a description will be given taking as an example the data store performance model 104 for the storage node 110.

In addition, the data store performance model 104 is generated for each HW resource of each of IO operations executed by the data stores. Examples of the IO operations include sequential read, sequential write, random read, and random write. Examples of the HW resource include a core of a CPU, a capacity of a memory, an NIC bandwidth, and an IO bandwidth of a disk device.

In the data store performance model generation process, first, the model generation unit 102 of the power consumption prediction program 101 of the management node 100 checks if the data store performance model 104 is generated for all of the IO operations to be executed in a target data store for which the data store performance model 104 is to be generated (Step 410). If the data store performance model 104 is generated for all the IO operations (Step 410: Yes), the model generation unit 102 ends the process.

If the data store performance model 104 is not generated for any of the IO operations (Step 410: No), the model generation unit 102 determines if the data store performance model 104 is generated for all the HW resources with respect to the target IO operation that is the any of the IO operations for which the data store performance model 104 is not generated (Step 420). If the data store performance model 104 with respect to all of the HW resources is generated (Step 420: Yes), the model generation unit 102 returns to the processing of Step 410.

If the data store performance model 104 for any of the HW resources is not generated (Step 420: No), the model generation unit 102 generates the data store performance model 104 for a target HW resource that is any of the HW resources for which the data store performance model 104 is not generated. Specifically, first, the IO benchmark execution unit 302 of the model generation unit 102 outputs to the resource allocation control program 112 of the storage node 110 an instruction for changing the resource allocation amount, with respect to the target HW resource, to be allocated to the target data store, thereby changing the resource allocation amount (Step 430). Note that, for the HW resources other than the target HW resource, for example, an existing program may be used as the resource allocation control program 112 of such a predetermined allocation amount that is not a bottleneck to the performance of the target data store. For example, because the Linux (registered trademark) operating system includes a resource allocation program called Cgroups, the Cgroups may be used as the resource allocation control program 112.

Subsequently, the IO benchmark execution unit 302 causes an IO benchmark to be executed with respect to the target data store of the storage node 110, thereby performing performance measurement of the target data store (Step 440). The performance measurement of the target data store is processing of measuring performance of the target data store with respect to the target IO operation, and specifically, is processing of measuring a performance index obtained by evaluating the performance of the target data store. The performance index of the target data store is, for example, a throughput.

Then, the model generation unit 102 determines if the number of executions of the performance measurement for the target IO operation is equal to or larger than a threshold (Step 450). The threshold here is, for example, the number of executions necessary for generating the data store performance model, and is determined in advance, for example.

If the number of executions is less than a threshold (Step 450: No), the model generation unit 102 returns to the processing of Step 430 and changes again the resource allocation amount of the target HW resource to be allocated to the target data store. The change of the resource allocation amount can be achieved, for example, by increasing or decreasing the resource allocation amount by a step of a predetermined amount from an initial value. The initial value and the predetermined amount are determined in advance, for example.

If the number of executions is equal to or larger than the threshold (Step 450: Yes), the model generation unit 102 generates the data store performance model 104 with respect to the target HW resource of the target IO operation in the target data store on the basis of measurement results of the performance measurement, and registers the data store performance model 104 in the data store performance model management table 305 (Step 460), and the model generation unit 102 returns to the processing of Step 420.

Figure 5:
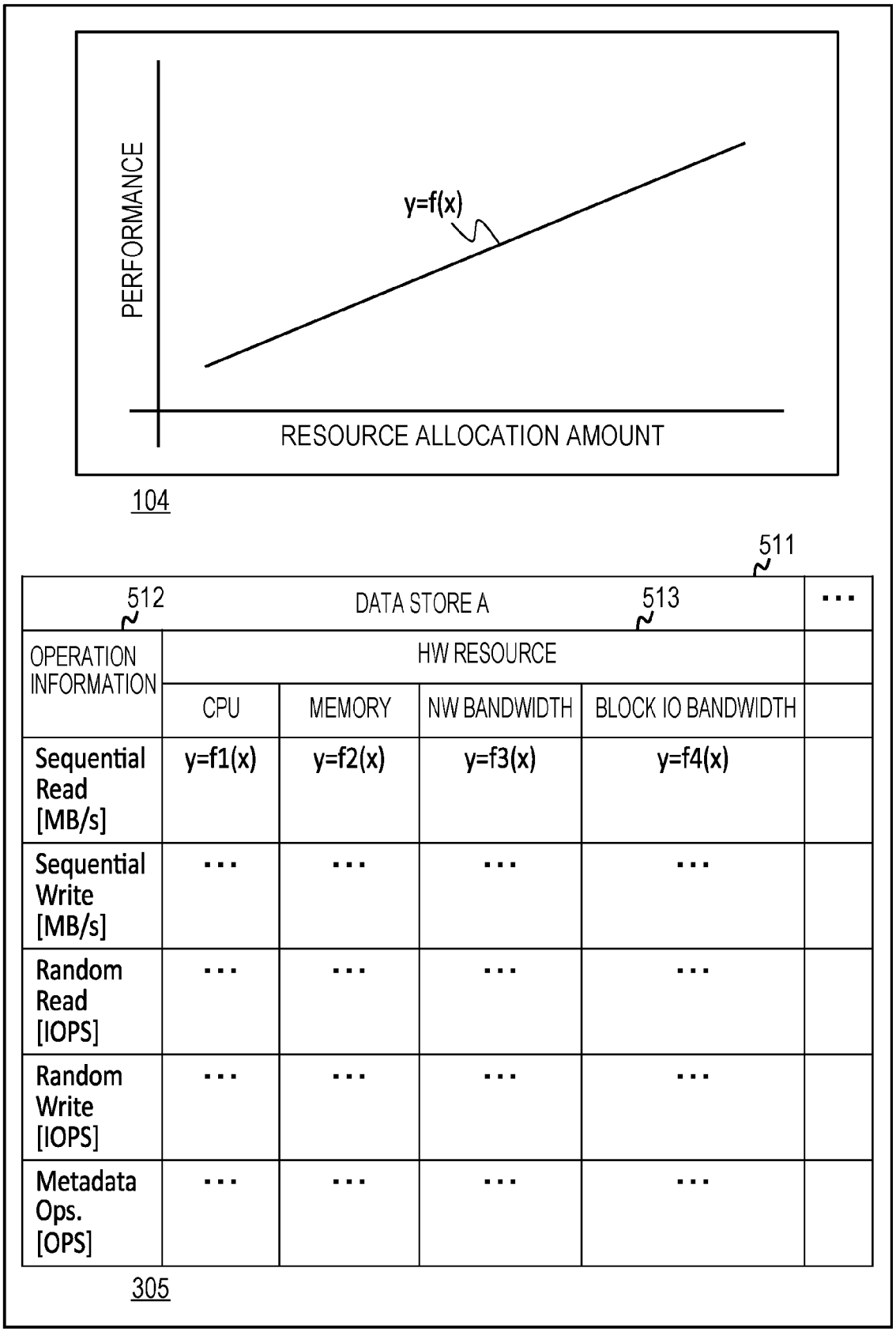
FIG. 5 is a diagram illustrating an example of a data store performance model.

FIG. 5 is a diagram illustrating examples of the data store performance mode 104 and the data store performance model management table 305.

In the example of FIG. 5, an expression y=f(x) of an approximate curve of a graph representing a relationship of a performance (performance index) with respect to the resource allocation amount is generated as the data store performance model 104. In the expression, y represents performance of the data store, and x represents the resource allocation amount. To generate the graph and derive the expression of the approximate curve, an existing program such as spreadsheet software can be used, for example.

In the examples of FIG. 5, the data store performance model management table 305 includes fields 512 and 513 for each field 511 that stores identification information to be used to identify a data store. The field 512 stores operation information representing the type of IO operation. The field 513 stores the data store performance model 104 for the IO operation represented by operation information in the field 512. Specifically, the field 513 includes a plurality of fields for storing data store performance model 104 for each HW resource.

Note that the data store performance model 104 and the data store performance model management table 305 illustrated in FIG. 5 are merely examples, and the present invention is not limited to these examples. For example, the data store performance model 104 may be data in which all the measured performance indices are recorded for each resource allocation amount.

Figure 6:
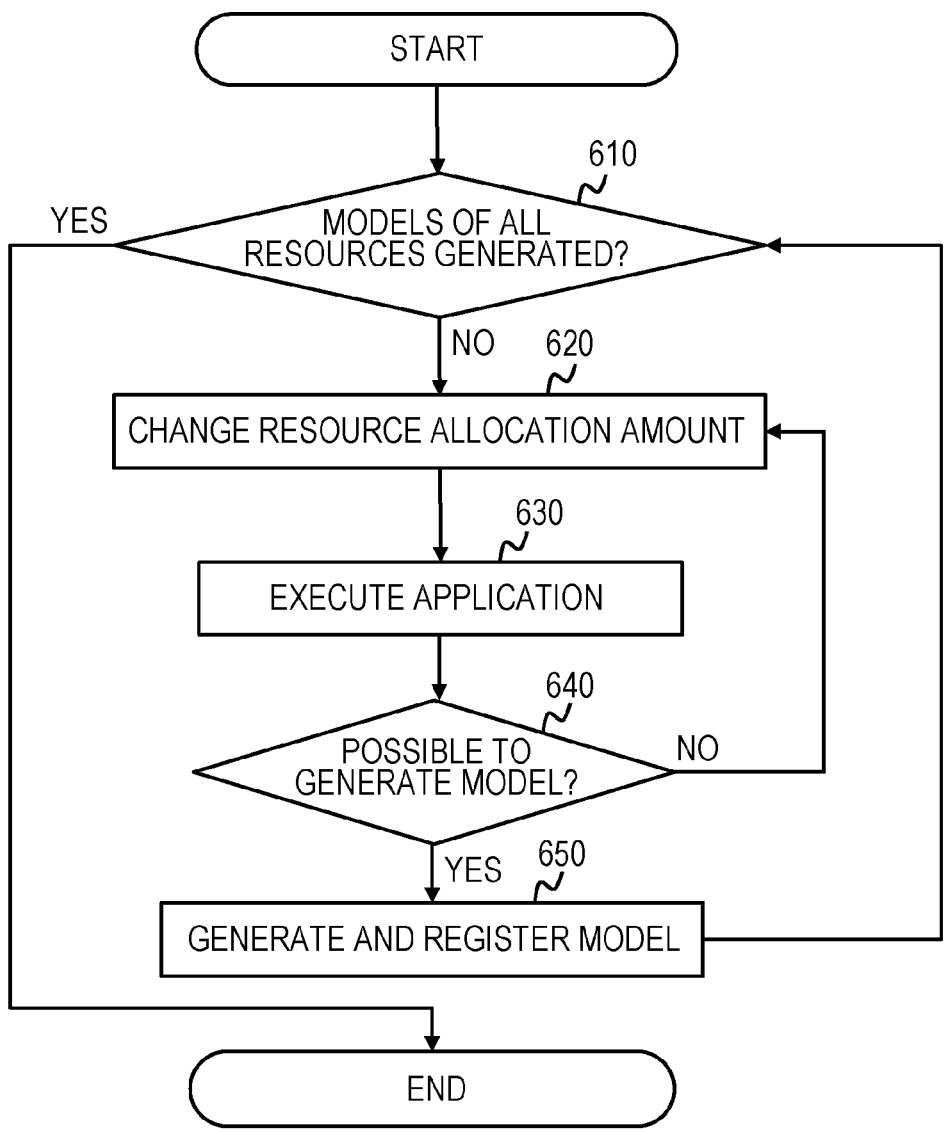
FIG. 6 is a flowchart for describing an example of an application performance model generation process.

FIG. 6 is a flowchart for describing an example of an application performance model generation process for generating the application performance model 105 according to an embodiment of the present disclosure.

An application performance model 105 is generated for the compute nodes 140 and 150. In the present embodiment, the compute nodes 140 and 150 each have HW specifications equivalent to each other. In this case, the application performance model 105 is only required to be generated for one of the compute nodes 140 and 150. Herein after, a description will be given taking as an example the application performance model 105 for the compute node 140.

In addition, the application performance model 105 is a performance model representing a relationship between the resource allocation amount allocated to an application to be executed by the compute node 140 and the performance of the application, and the application performance model 105 is generated for each HW resource.

In the application performance model generation process, first, the model generation unit 102 of the power consumption prediction program 101 of the management node 100 checks if the application performance model 105 is generated for all of the HW resources with respect to the target application that is an application for which the application performance model 105 is to be generated (Step 610). If the application performance model 105 for all of the HW resources is generated (Step 610: Yes), the model generation unit 102 ends the process.

If the application performance model 105 is not generated for any of the HW resources (Step 610: No), the model generation unit 102 generates the application performance model 105 with respect to the target HW resource that is the HW resource for which the application performance model 105 is not generated. Specifically, first, the application execution unit 303 of the model generation unit 102 outputs to the resource allocation control program 142 of each compute node 140 an instruction for changing the resource allocation amount, with respect to the target HW resource, to be allocated to the application, thereby causing the resource allocation control program 142 to change the resource allocation amount (Step 620). As the resource allocation control program 142, it is possible to use a program similar to the resource allocation control program 112 of the storage node 110.

Subsequently, the application execution unit 303 outputs an instruction of executing the target application to the compute node 140 to cause the compute node 140 to execute processing by the target application, and thereby performs performance measurement of the target application (Step 630). In the performance measurement of the target application, an execution time of processing or the like is measured as the performance index, for example.

Then, the model generation unit 102 determines if the number of executions of the performance measurement with respect to the target application is equal to or larger than a threshold (Step 640). The threshold here is, for example, the number of executions necessary for generating the application performance model, and is determined in advance, for example.

If the number of executions is less than the threshold (Step 640: No), the model generation unit 102 returns to the processing of Step 620 and changes again the resource allocation amount of the target HW resource to be allocated to the target application. The change of the resource allocation amount can be achieved, for example, by increasing or decreasing the resource allocation amount by a step of a predetermined amount from an initial value. The initial value and the predetermined amount are determined in advance, for example.

If the number of executions is equal to or larger than the threshold (Step 640: Yes), the model generation unit 102 generates the application performance model 105 with respect to the target HW resource in the target application on the basis of measurement results of the performance measurement, and registers the application performance model 105 in the application performance model management table 306 (Step 650), and the model generation unit 102 returns to the processing of Step 610.

Figure 7:
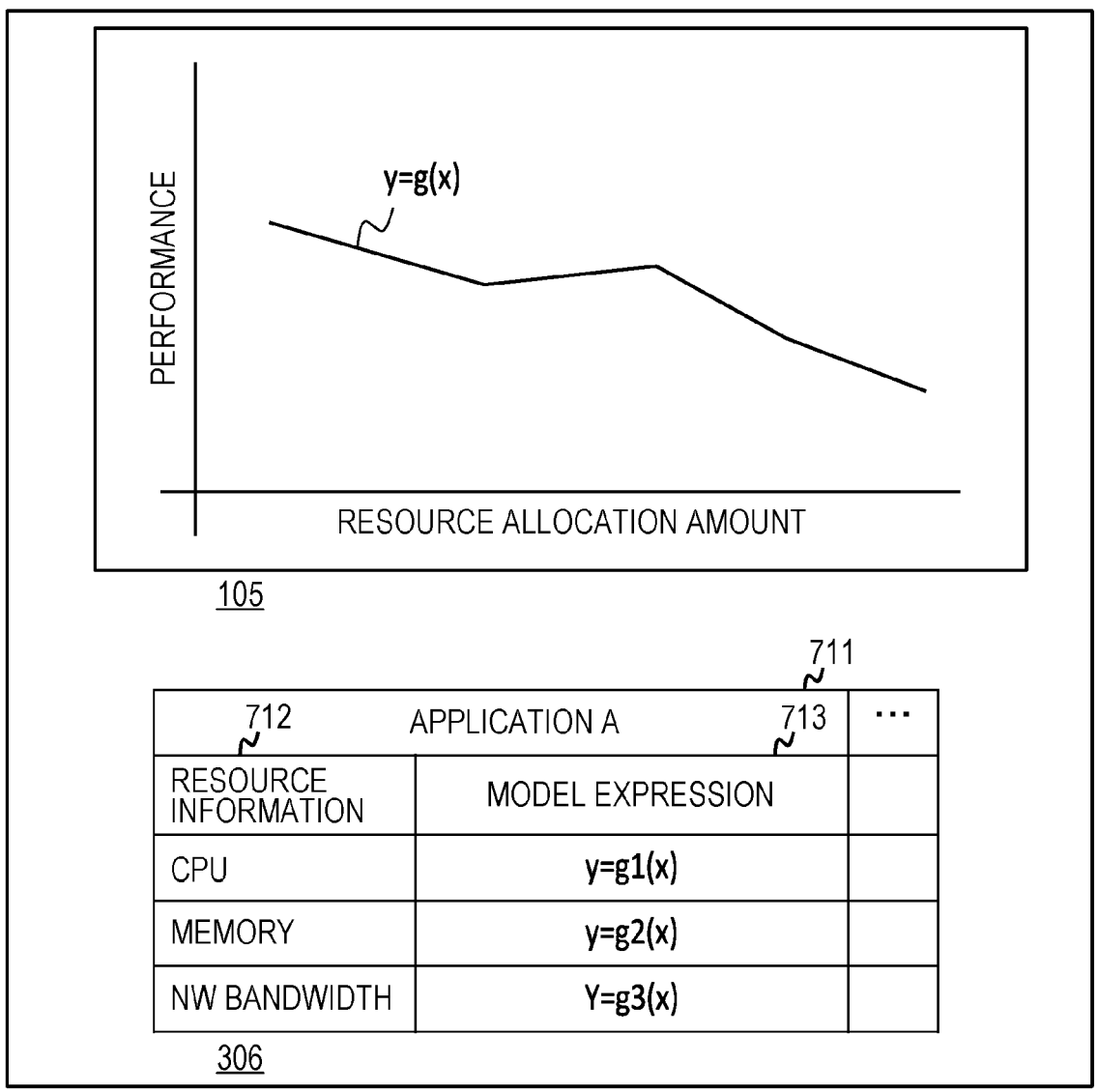
FIG. 7 is a diagram illustrating an example of an application performance model.

FIG. 7 is a diagram illustrating examples of the application performance model 105 and the application performance model management table 306.

In the example of FIG. 7, an expression y=g(x) of an approximate curve of a graph representing a relationship of a performance (performance index) with respect to the resource allocation amount is generated as the application performance model 105. In the expression, y represents performance of the application, and x represents the resource allocation amount. To generate the graph and derive the expression of the approximate curve, an existing program such as spreadsheet software can be used, for example.

In the example of FIG. 7, the application performance model management table 306 includes fields 712 and 713 for each field 711 that stores identification information to be used to identify an application. The field 712 stores resource information representing a type of an HW resource. The field 713 stores the application performance model 105 with respect to the HW resource represented by the resource information of the field 712. The HW resource here is, for example, a core of a CPU, a capacity of a memory, and an NIC bandwidth.

Note that the application performance model 105 and the application performance model management table 306 illustrated in FIG. 7 are merely examples, and the present invention is not limited to these examples. For example, the application performance model 105 may be data in which all the measured performance indices are recorded for each resource allocation amount.

Figure 8:
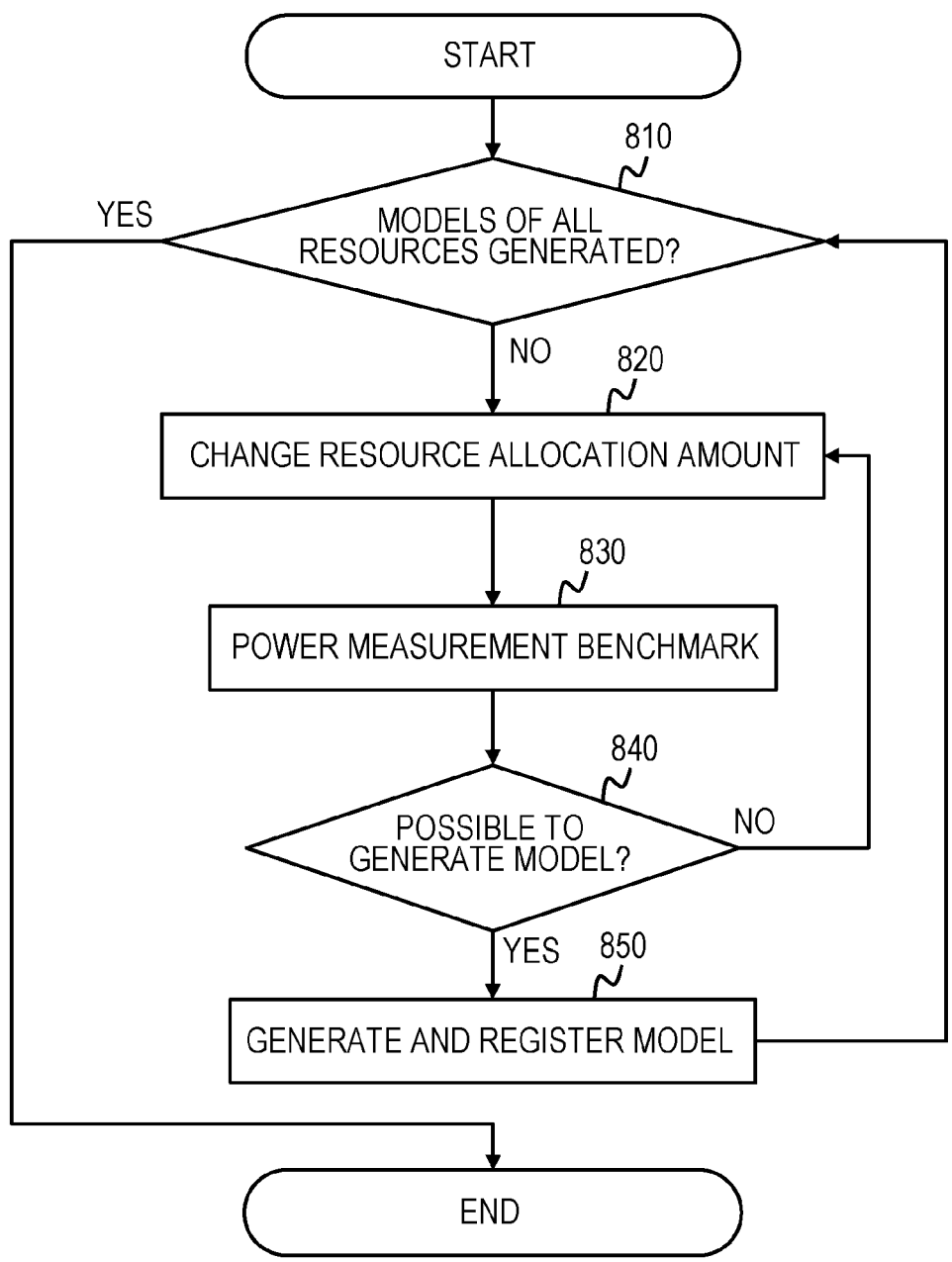
FIG. 8 is a flowchart for describing an example of a power consumption model generation process.

FIG. 8 is a flowchart for describing an example of a power consumption model generation process for generating the power consumption model 106 according to an embodiment of the present disclosure.

The power consumption model 106 is generated for each type of computer node. That is, in the present embodiment, the power consumption model 106 is generated for each of the storage nodes and the compute nodes. However, when the storage node and the compute node each have HW specifications equivalent to each other, one power consumption model 106 may be generated. Hereinafter, a description will be given taking, as an example, a process of generating the power consumption model 106 with respect to the storage node 110.

The power consumption model 106 is a model representing a relationship between the resource allocation amount to be allocated to the data store or the application and the power consumption, and is generated for each HW resource.

In the power consumption model generation process, first, the model generation unit 102 of the power consumption prediction program 101 of the management node 100 checks if the power consumption model 106 for all of the HW resources is generated with respect to the computer node (here, the computer node is the storage node 110) for which the power consumption model 106 is generated (Step 810). If the power consumption model 106 for all of the HW resources is generated (Step 810: Yes), the model generation unit 102 ends the process.

If the power consumption model 106 is not generated for any of the HW resources (Step 810: No), the model generation unit 102 generates the power consumption model 106 for the target HW resource that is the HW resource for which the power consumption model 106 is not generated. Specifically, first, the power measurement benchmark execution unit 304 of the model generation unit 102 outputs to the resource allocation control program 112 of the storage node 110 an instruction for changing the resource allocation amount, with respect to the target HW resource, to be allocated to the power measurement benchmark 111, thereby changing the resource allocation amount to be allocated to the power measurement benchmark 111 (Step 820). The resource allocation amount to be allocated to the power measurement benchmark 111 corresponds to a use amount to be used in the power measurement benchmark 111.

Subsequently, the power measurement benchmark execution unit 304 outputs to the storage node 110 an instruction for executing the power measurement benchmark 111 to cause the power measurement benchmark 111 to execute a benchmark process, and thereby measures the power consumption with respect to the resource allocation amount of the target HW resource (Step 830). The power measurement benchmark 111 is specifically a program that executes a benchmark process that measures the performance of an HW resource while using the resource allocation amount allocated to the power measurement benchmark 111 as much as possible. The power measurement benchmark execution unit 304 acquires the power consumption of the storage node 110 from the power acquisition program 113, and measures an increase amount in the power consumption at the time of execution of the benchmark process from before the execution of the benchmark process, as the power consumption with respect to the resource allocation amount.

Then, the model generation unit 102 determines if the number of executions of the power measurement with respect to the target HW resource is equal to or larger than a threshold (Step 840). The threshold here is, for example, the number of executions necessary for generating the power consumption model, and is determined in advance.

If the number of executions is less than the threshold (Step 840: No), the model generation unit 102 returns to the processing of Step 820 and changes again the resource allocation amount to be allocated to the target HW resource. The change of the resource allocation amount can be achieved, for example, by increasing or decreasing the resource allocation amount by a step of a predetermined amount from an initial value. The initial value and the predetermined amount are determined in advance, for example.

If the number of executions is equal to or larger than the threshold (Step 840: Yes), the model generation unit 102 generates the power consumption model with respect to the target HW resource on the basis of measurement results of the power measurement and registers the power consumption model in the power consumption model management table 307 (Step 850), and the model generation unit 102 returns to the processing of Step 810.

Figure 9:
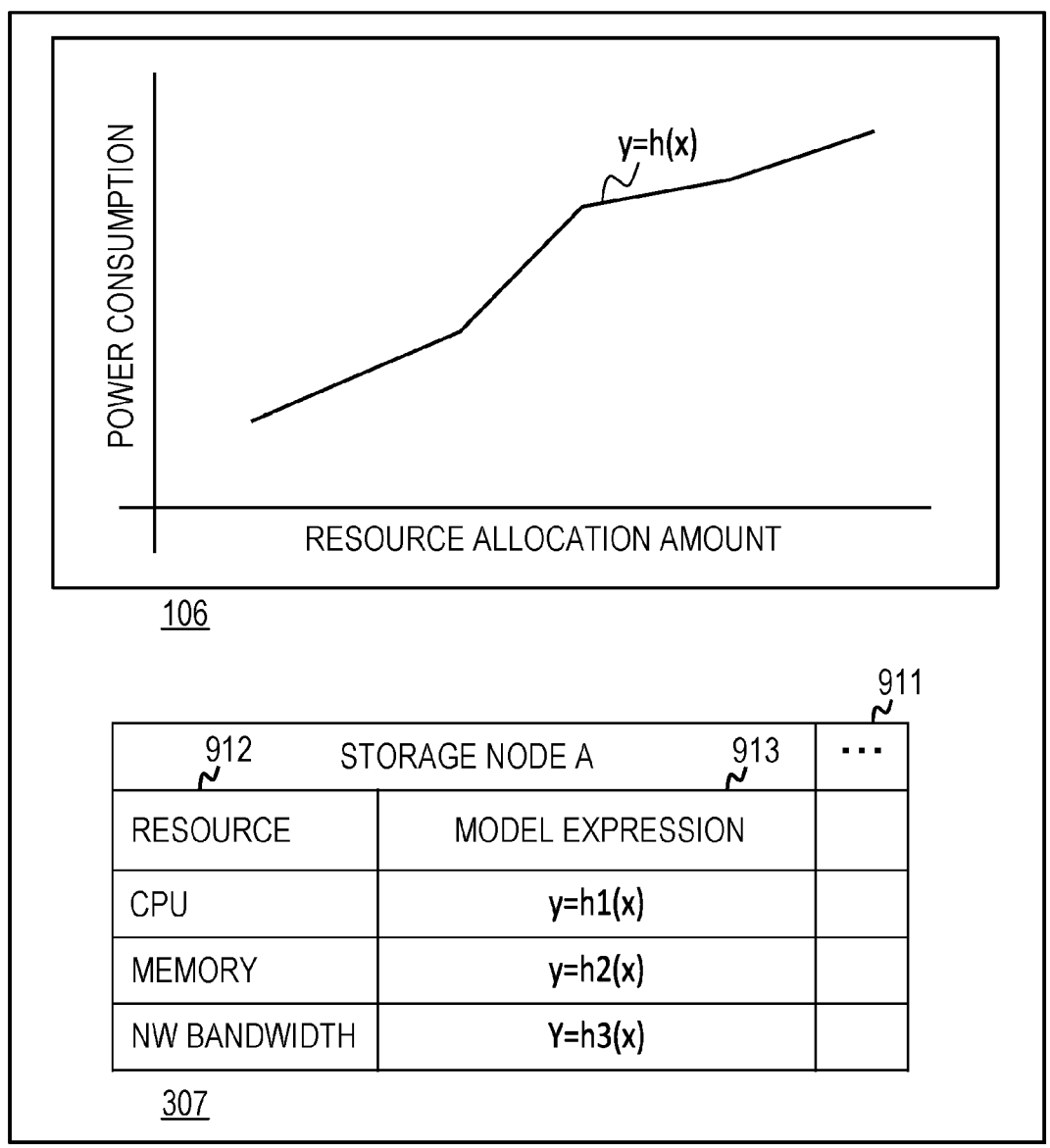
FIG. 9 is a diagram illustrating an example of a power consumption model.

FIG. 9 is a diagram illustrating examples of the power consumption model 106 and the power consumption model management table 307.

In the example of FIG. 9, an expression $y=h(x)$ of an approximate curve of a graph representing a relationship of a performance (performance index) with respect to the resource allocation amount is generated as the power consumption model 106. In the expression, y is a power consumption, and x is the resource allocation amount. To generate the graph and derive the expression of the approximate curve, an existing program such as spreadsheet software can be used, for example.

In the examples of FIG. 9, the power consumption model management table 307 includes fields 912 and 913 for each field that stores identification information to be used to identify a computer node. The field 912 stores resource information representing a type of an HW resource. The field 913 stores the power consumption model 106 with respect to the HW resource represented by the resource information in the field 912.

Note that the power consumption model 106 and the power consumption model management table 307 illustrated in FIG. 9 are merely examples, and the present invention is not limited to these examples. For example, the power consumption model 106 may be data in which all the measured power consumptions are recorded for each HW resource.

Figure 10:
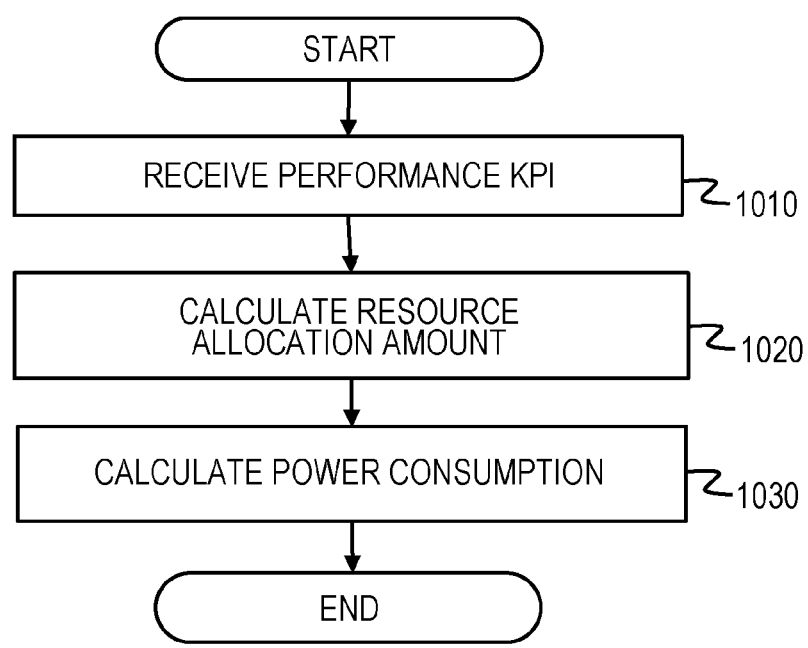
FIG. 10 is a flowchart for describing an example of a first power consumption calculation process.

FIG. 10 is a flowchart for describing an example of first power consumption calculation processing for calculating power consumption of the data store.

In the first power consumption calculation process, first, the target performance reception unit 301 of the power consumption prediction program 101 of the management node 100 receives, from the client program 331 of the client node 170, a data store performance key performance indicator (KPI) that is a target performance with respect to the data store (Step 1010). The data store performance KPI is received by the client program 331 from a user.

Subsequently, the power consumption calculation unit 103 calculates, for each HW resource, the resource allocation amounts to be allocated to the storage nodes 110 and 120 so as to satisfy the data store performance KPI (Step 1020). Then, the power consumption calculation unit 103 calculates the sum of the power consumptions in accordance with the resource allocation amounts of respective ones of the HW resource as the power consumption with respect to the data store performance KPI (Step 1030), and ends the processing.

Figure 11:
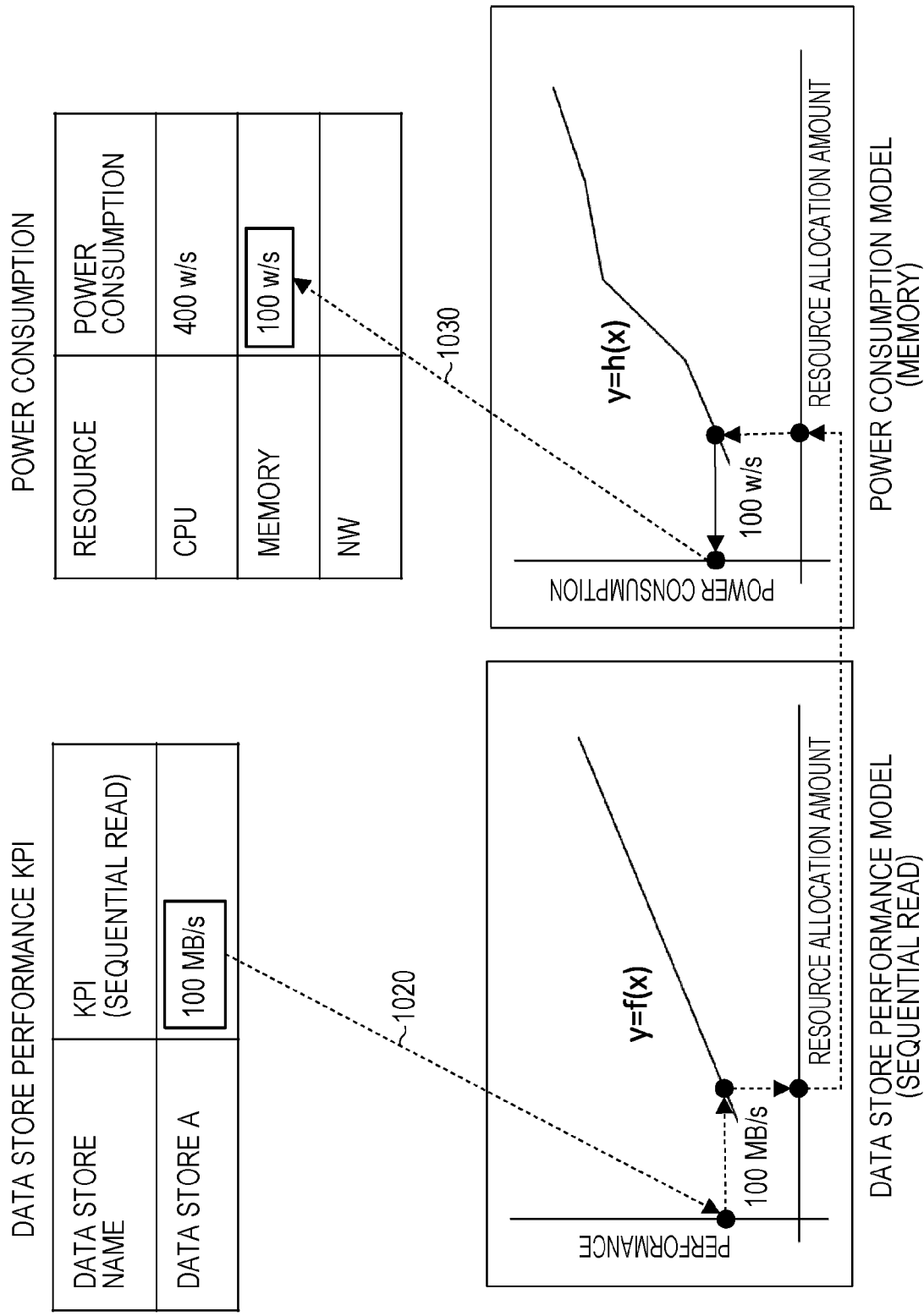
FIG. 11 is a diagram illustrating a specific example of processing of Steps 1020 and 1030 in FIG. 10.

FIG. 11 is a diagram illustrating a specific example of processing of Steps 1020 and 1030 in FIG. 10. FIG. 11 illustrates an example of processing in a case where the HW resource is a memory.

As illustrated in FIG. 11, in Step 1020, the power consumption calculation unit 103 uses the data store performance model 104 to calculate the resource allocation amount corresponding to the data store performance KPI, as the resource allocation amount necessary to implement the data store performance KPI. Specifically, the power consumption calculation unit 103 calculates the resource allocation amount x by substituting the data store performance KPI into the performance y of the data store in the expression $y=f(x)$, which is the data store performance model 104.

Then, in Step 1030, the power consumption calculation unit 103 calculates the power consumption corresponding to the resource allocation amount by using the power consumption model 106 of the memory. Specifically, the power consumption calculation unit 103 calculates the power consumption y by substituting the resource allocation amount into the resource allocation amount x in the expression y=h(x), which is the power consumption model 106.

Figure 12:
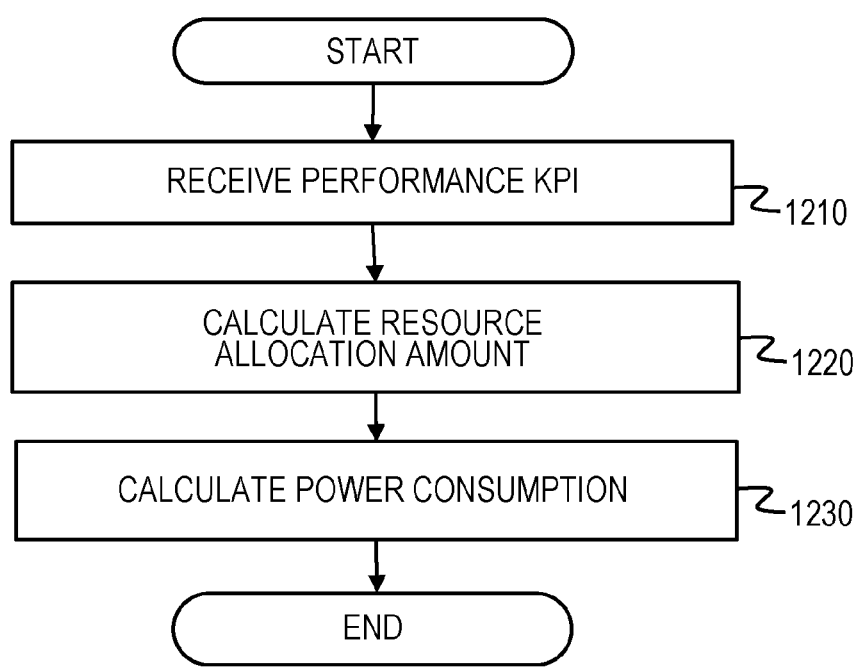
FIG. 12 is a flowchart for explaining an example of a second power consumption calculation process.

FIG. 12 is a flowchart for describing an example of the second power consumption calculation processing for calculating power consumption of the application.

In the second power consumption calculation process, first, the target performance reception unit 301 of the power consumption prediction program 101 of the management node 100 receives, from the client program 331 of the client node 170, an application performance KPI that is the target performance with respect to the application (Step 1210). The application performance KPI is received by the client program 331 from a user.

Subsequently, the power consumption calculation unit 103 calculates, for each HW resource, the resource allocation amounts to be allocated to the compute nodes 140 and 150 so as to satisfy the application performance KPI (Step 1220). Then, the power consumption calculation unit 103 calculates the sum of the power consumptions in accordance with the resource allocation amounts of respective ones of HW resource as the power consumption with respect to the application performance KPI (Step 1230), and ends the processing.

Figure 13:
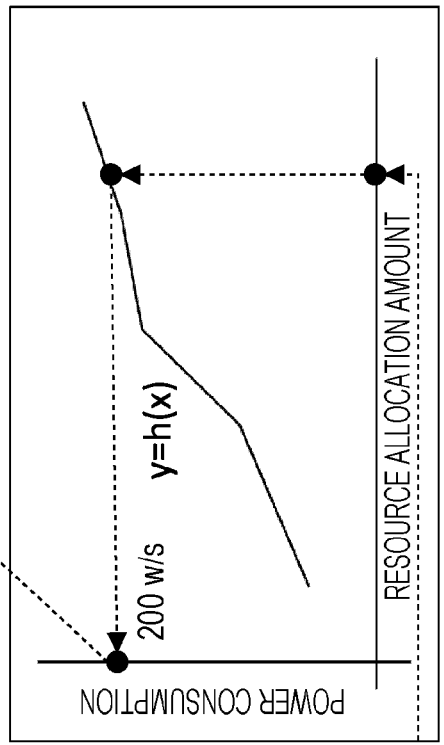
FIG. 13 is a diagram illustrating a specific example of processing of Steps 1220 and 1230 in FIG. 12.
Figure 13:
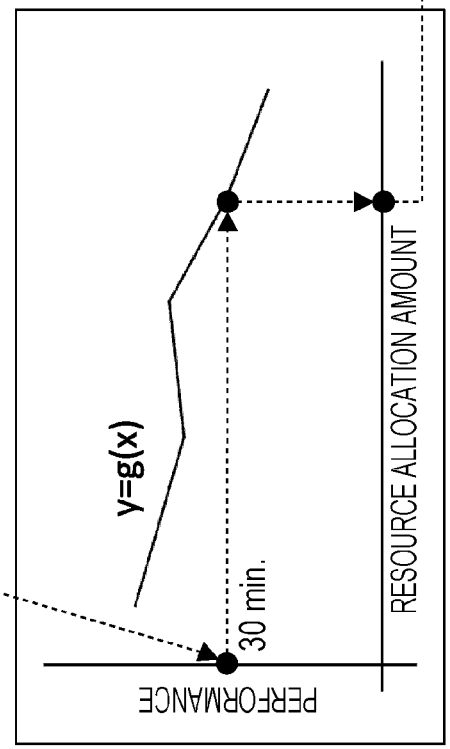

FIG. 13 is a diagram illustrating a specific example of processing of Steps 1220 and 1230 in FIG. 12. FIG. 13 illustrates an example of processing in a case where the HW resource is a memory.

As illustrated in FIG. 13, in Step 1220, the power consumption calculation unit 103 uses the application performance model 105 to calculate the resource allocation amount corresponding to the application performance KPI, as the resource allocation amount necessary to implement the application performance KPI. Specifically, the power consumption calculation unit 103 calculates the resource allocation amount x by substituting the application performance KPI into the performance y of the application in the expression y=g(x), which is the application performance model 105.

Then, in Step 1230, the power consumption calculation unit 103 calculates the power consumption corresponding to the resource allocation amount by using the power consumption model 106 of the memory. Specifically, the power consumption calculation unit 103 calculates the power consumption y by substituting the resource allocation amount into the resource allocation amount x in the expression y=h(x), which is the power consumption model 106.

As described above, according to the present embodiment, the CPU 202 of the management node 100 measures the power consumption of a computer node while causing the computer node to execute the power measurement benchmark 111 that uses hardware whose resource is allocated to a program to be executed by the computer node, where the CPU 202 is changing the use amount of the resource while causing the computer node to execute the power measurement benchmark 111. The CPU 202 generates the power consumption model 106 representing the relationship between the allocation amount of the resource to be allocated to the program and the power consumption on the basis of the measurement result obtained by measuring the power consumption. Therefore, the electricity consumption amount of the computer node can be predicted using the power consumption model 106.

In the present embodiment, the power consumption prediction program 101 measures the performance of a program while causing the computer node to execute the program to which a resource is allocated while changing a resource allocation amount, and generates the performance model representing the relationship between the resource allocation amount and the performance on the basis of the measurement result. In addition, the CPU 202 receives a target performance and calculates a predicted consumption amount that predicts the power consumption to be consumed to achieve the target performance, on the basis of the target performance, the performance model, and power consumption model 106. Therefore, it is possible to predict the power consumption to be consumed to achieve the target performance.

In addition, in the present embodiment, the CPU 202 calculates the resource allocation amount necessary to achieve the target performance on the basis of the performance model, and calculates, as the predicted consumption amount, the power consumption in accordance with the necessary resource allocation amount on the basis of the power consumption model 106. Therefore, it is possible to appropriately predict the power consumption from the target performance.

In the present embodiment, the CPU 202 generates the power consumption model 106 for each piece of hardware whose HW resource is to be allocated. Therefore, it is possible to more appropriately predict the power consumption.

In the present embodiment, the CPU 202 generates the power consumption model 106 for each type of computer node. Therefore, it is possible to more appropriately predict the power consumption.

In addition, in the present embodiment, the programs for which the power consumption model 106 is generated are the data stores 131 and 132 and the applications 161 and 162. Therefore, it is possible to more appropriately predict the power consumption of the computer nodes used in a storage system.

The prediction of the power consumption obtained by the present disclosure can be used, for example, for the following purposes: management of power consumption for each cluster whose bases and computer nodes having equivalent power efficiencies; management of power consumption of an application being executed for each user or user group; and determining where to dispose data and an application to increase a utilization rate of renewable energy.

The above-described embodiment of the present disclosure is an example for describing the present disclosure, and is not intended to limit the scope of the present disclosure only to the embodiment. Those skilled in the art can practice the present disclosure in various other aspects without departing from the scope of the present disclosure.

What is claimed is:

1. A computer comprising
a processor, the processor configured to
measure power consumption of a predetermined computer node while causing the predetermined computer node to execute a power measurement program that uses a resource of hardware whose resource is allocated to a program to be executed on the predetermined computer node, the processor changing a use amount of the resource while causing the predetermined computer node to execute the power measurement program, generate a power consumption model representing a relationship between an allocation amount of the resource to be allocated to the program and the power consumption on a basis of a measurement result obtained by measuring the power consumption, measure performance of the program while causing the predetermined computer node to execute the program while changing the allocation amount, generate a performance model representing a relationship between the allocation amount and the performance on a basis of a measurement result obtained by measuring the performance, receive a target value of the performance, and calculate a predicted consumption amount that predicts the power consumption to be consumed to achieve performance of the target value, on a basis of the target value, the performance model, and the power consumption model.

2. The computer according to claim 1, wherein
the processor is further configured to
  calculate a necessary allocation amount that is necessary to achieve the performance of the target value on a basis of the performance model, and
  calculate, as the predicted consumption amount, the power consumption in accordance with the necessary allocation amount on a basis of the power consumption model.

3. The computer according to claim 1, wherein
the hardware includes a plurality of pieces of hardware, and
the processor is configured to generate the power consumption model for each piece of hardware.

4. The computer according to claim 1, wherein
the predetermined computer node includes a plurality of types, and
the processor is configured to generate the power consumption model for each of the plurality types of the predetermined computer node.

5. The computer according to claim 1, wherein the program is a data store program for reading and writing data from and to a storage device.

6. The computer according to claim 1, wherein the program is an application program for performing a predetermined process using data to be read and written from and to a storage device.

7. A model generation method to be performed on a computer including a processor, the method comprising:
  the processor measuring power consumption of a predetermined computer node while causing the predetermined computer node to execute a power measurement program that uses a resource of hardware whose resource is allocated to a program to be executed on the predetermined computer node, the processor changing a use amount of the resource to be used while causing the predetermined computer node to execute the power measurement program; and
  the processor generating a power consumption model representing a relationship between an allocation amount of the resource to be allocated to the program and the power consumption on a basis of a measurement result obtained by measuring the power consumption,
  the processor measuring performance of the program while causing the predetermined computer node to execute the program while changing the allocation amount,
  the processor generating a performance model representing a relationship between the allocation amount and the performance on a basis of a measurement result obtained by measuring the performance,
  the processor receiving a target value of the performance, and
  the processor calculating a predicted consumption amount that predicts the power consumption to be consumed to achieve performance of the target value, on a basis of the target value, the performance model, and the power consumption model.

* * * * *